United States Patent [19]

Wai

[11] Patent Number: 5,347,308
[45] Date of Patent: Sep. 13, 1994

[54] ADAPTIVE CODING METHOD FOR INTERLACED SCAN DIGITAL VIDEO SEQUENCES

[75] Inventor: Lucas H. Y. Wai, Marsiling, Singapore

[73] Assignee: Matsushita Electric Industrial Co., Ltd., Osaka, Japan

[21] Appl. No.: 956,954

[22] Filed: Oct. 5, 1992

[30] Foreign Application Priority Data

Oct. 11, 1991 [JP] Japan .................. 3-263911

[51] Int. Cl.$^5$ ............................................. H04N 7/137
[52] U.S. Cl. ..................................... 348/394; 348/420
[58] Field of Search ................ 358/133, 136; 348/394, 348/416, 420; A04N 7/137

[56] References Cited

U.S. PATENT DOCUMENTS

| | | | |
|---|---|---|---|
| 4,703,350 | 10/1987 | Hinman | 358/133 |
| 4,837,618 | 6/1989 | Hatori et al. | 358/136 |
| 4,849,812 | 7/1989 | Borgers . | |
| 4,982,285 | 1/1991 | Sugiyama | 358/136 |
| 4,984,077 | 1/1991 | Uchida | 358/136 |
| 4,989,089 | 1/1991 | Chantelou et al. . | |
| 4,999,704 | 3/1991 | Ando . | |
| 5,091,782 | 2/1992 | Krause et al. | 358/136 |
| 5,093,720 | 3/1992 | Krause et al. | 358/133 |
| 5,150,432 | 9/1992 | Ueno et al. | 358/136 |
| 5,168,357 | 12/1992 | Kutka . | |
| 5,173,773 | 12/1992 | Ueda et al. | 358/136 |
| 5,175,618 | 12/1992 | Ueda et al. | 348/416 |
| 5,185,819 | 2/1993 | Ng et al. | 358/136 |
| 5,235,419 | 8/1993 | Krause | 358/136 |

FOREIGN PATENT DOCUMENTS

| | | |
|---|---|---|
| 0294961A2 | 12/1988 | European Pat. Off. . |
| 0368400A1 | 5/1990 | European Pat. Off. . |
| 0484140A2 | 5/1992 | European Pat. Off. . |
| 0490799A1 | 6/1992 | European Pat. Off. . |
| 9015506A1 | 12/1990 | World Int. Prop. O. . |

OTHER PUBLICATIONS

Kazuto Kamikura, et al "Consideration of Bit Allocation and Distribution of Moving Image Coding for Storage Media".
"MPEG Video Simulation Model Three (SM3), " International Organization for Standardization, pp. 1-58, Jul. 1990.
Ichiro Ando, et al "Some Considerations and Experiments of Interlaced Moving Image Coding".
Feng-Ming Wang, et al "High Quality Coding of the Even Fields based on the Odd Fields of Interlaced Video Sequences," IEEE Transactions on Circuits and Systems, pp. 1-6, Jan. 1991.

Primary Examiner—Tommy P. Chin
Assistant Examiner—Richard Lee
Attorney, Agent, or Firm—Stevens, Davis, Miller & Mosher

[57] ABSTRACT

An efficient coding system for interlaced scan video sequences. An input picture is partitioned into smaller blocks of pixel data where the two fields in each blocks are rexamined for correlation. If the difference between the two fields in the block is low (or the correlation is high), the block will be coded with a frame coding method that assumes all lines in the block are progressive scanned, and therefore, with efficient inter-frame motion compensation method and chrominance data intra-frame sub-sampling method designed. On the other hand, if the difference between the two fields in the block is high (or the correlation is low), the block will be coded with a field coding method where more emphasis is made on exploring correlation within each field (intra-field) and correlation of each field and its neighboring fields (inter-field); furthermore, intra-field sub-sampling of the chrominance data is better performed in such blocks.

36 Claims, 9 Drawing Sheets

ADAPTIVE CODING METHOD FOR INTERLACED SCAN DIGITAL VIDEO SEQUENCES

BACKGROUND OF THE INVENTION

This invention relates to efficient information coding of interlaced scan digital video sequences for digital storage media or transmission media.

Standardization efforts of digital coding methods for video signals are actively progressing nowadays. Such standardization efforts include the studies of digital coding of various video signal formats at different bit-rates. In terms of scanning techniques which define how the video sequence is captured by recording devices and refreshed on display devices, video sequences can be classified into two types: progressive scan video sequences, and interlaced scan video sequences. In a progressive scan video sequence, a frame in the sequence is captured and refreshed sequentially line by line from top to bottom of the frame. An interlaced scan video sequence frame consists of two fields, the even field made up of the even lines of the frame and the odd field made up of the odd lines of the frame. Capturing and refreshing are performed first on the even field, sequentially from top to bottom of the field, and followed by the odd field in the same manner. Since a large number of present sources use the interlaced scan format (e.g. NTSC, PAL), a number of research efforts had been directed to efficient coding of the interlaced scan video sequence.

The prior research results can be classified into three categories: frame coding processes, field coding processes, and interpolated field coding processes. In a frame coding process, (For example in Kazuto Kamikura and Taikun Li, "Consideration of Bit Allocation and Distribution of Moving Image Coding for Storage Media", DAPA Meeting Report, Fourth Telematic Symposium, Tokyo, February 1991) a video sequence is basically coded frame by frame where the even and odd fields are combined in the interlaced manner (the frames are treated as if they were progressive). Each frame in a frame coding process can be partitioned into blocks of pixel data which are then processed by a block coding method such as Discrete Cosine Transform (DCT) Coding with or without Motion Compensation (MC) as described in MPEG Video Simulation Model Three, International Organization for Standardization, Coded Representation of Picture and Audio Information, 1990, ISO-IEC/JTC1/SC2/WG8 MPEG90/041. If a frame is coded independent of other frames in the sequence and without different treatments to the even field and the odd field, the process is called an intra-frame coding process; if the frame is coded with motion compensation using other frame(s) in the sequence, the process is called an inter-frame coding process. In summary, the frame coding process is a process whereby the video sequence is coded with just an intra-frame coding process, or a combination of intra-frame and inter-frame coding processes.

In a field coding process, a video sequence is first split into two sequences, the even field sequence and the odd field sequence, where each of the even field and odd field sequences is subjected to the same coding process. (See, for example, the paper by Ichiro Andoh, Y. Yamada et al., "Some Considerations and Experiments of Interlaced Moving Image Coding", DAPA Meeting Report, Fourth Telematic Symposium, Tokyo, February 1991.) Motion compensation or motion interpolation in a field coding process can be performed independently on each of the even field sequence and odd field sequence, or inter-dependently on the two sequences as illustrated by the paper by Ichiro Andoh et al. The field coding process, hence, is just an intra-field coding process or a combination of intra-field and inter-field coding processes.

As for the interpolated field coding process, only one of the field sequence is coded, and the other field sequence is reproduced by a prediction or interpolation process on the coded field sequence. Examples of this coding process are described in the paper by Feng-Ming Wang and Dimitris Anastassiou, "High-Quality Coding of the Even Fields Based on the Odd Fields of the Interlaced Video Sequences," IEEE Transection on Circuits and Systems, January 1991, and the MPEG Video Simulation Model Three, International Organization for Standardization, Coded Representation of Picture and Audio Information, 1990, ISO-IEC/JTC1/SC2/WG8 MPEG90/041.

With objects in the interlaced scan video sequence maintained stationary, correlation between adjacent pixels on every line and adjacent lines is high which allows popular image compression methods such as the conventional Discrete Cosine Transform Coding method, to achieve high compression ratio in a frame coding process (taking advantage of the high correlation between the lines) as compared of the high correlation between the lines) as compared to the field or interpolated field coding process. Inter-frame motion compensation can also be performed in this case with better efficiency. However, if objects in the sequence start to move, the correlation between the fields will drop, and hence the efficiency of the DCT method, for example, will be better if a field coding process is used. Furthermore, when motion compensation is involved in this situation, a inter-field coding process which performs the motion compensation individually on each fields has the advantage of better estimating the motion of the objects in the sequence. It can be seem that in general, the frame coding, field coding, and interpolated field coding process are sub-optimal in terms of efficiency given the fact that movement of objects in a sequence can be very dynamic. The improvement of efficiency of video coding systems is especially important in high bit-rate reduction coding systems.

SUMMARY OF THE INVENTION

In order to take advantage of frame (intra/inter) coding and field (intra/inter) coding processes, a method can be deviced to adaptively examine each region of the frame to decide which of the frame and field coding processes to use. In such a way, stationary regions in the frame are coded using a frame coding process efficiently making use of the high spatial correlations in the frame; and regions in the frame corresponding to the moving objects in the sequence are coded using field coding process since better correlation can be found within each fields in these regions.

This method can be done by partitioning each frame of an input interlaced scan video signal into smaller blocks of pixel data; determining a difference of pixel values between two fields within each of said blocks; subjecting a given block to a frame coding process if the difference between the two fields within the block is determined to be low; and otherwise subjecting the block to a field coding process.

By the above-described method, blocks with motion between the fields or less correlated fields can be separated from blocks that are highly spatially correlated between the fields, and field coding process or frame coding process can be optimally applied to achieve the best results in the two kinds of blocks mentioned. Such a case in the frame coding process, the block can be intra-frame coded using conventional block coding techniques such as the DCT method or inter-frame coded using block coding techniques with inter-frame motion compensation. As in the case of field coding process, the two fields in the block can be separated into sub-blocks and intra-field coded using conventional block coding method, or inter-field coded with inter-field motion compensation.

DETAILED DESCRIPTION OF THE PREFERRED EMBODIMENTS

Figure 5:
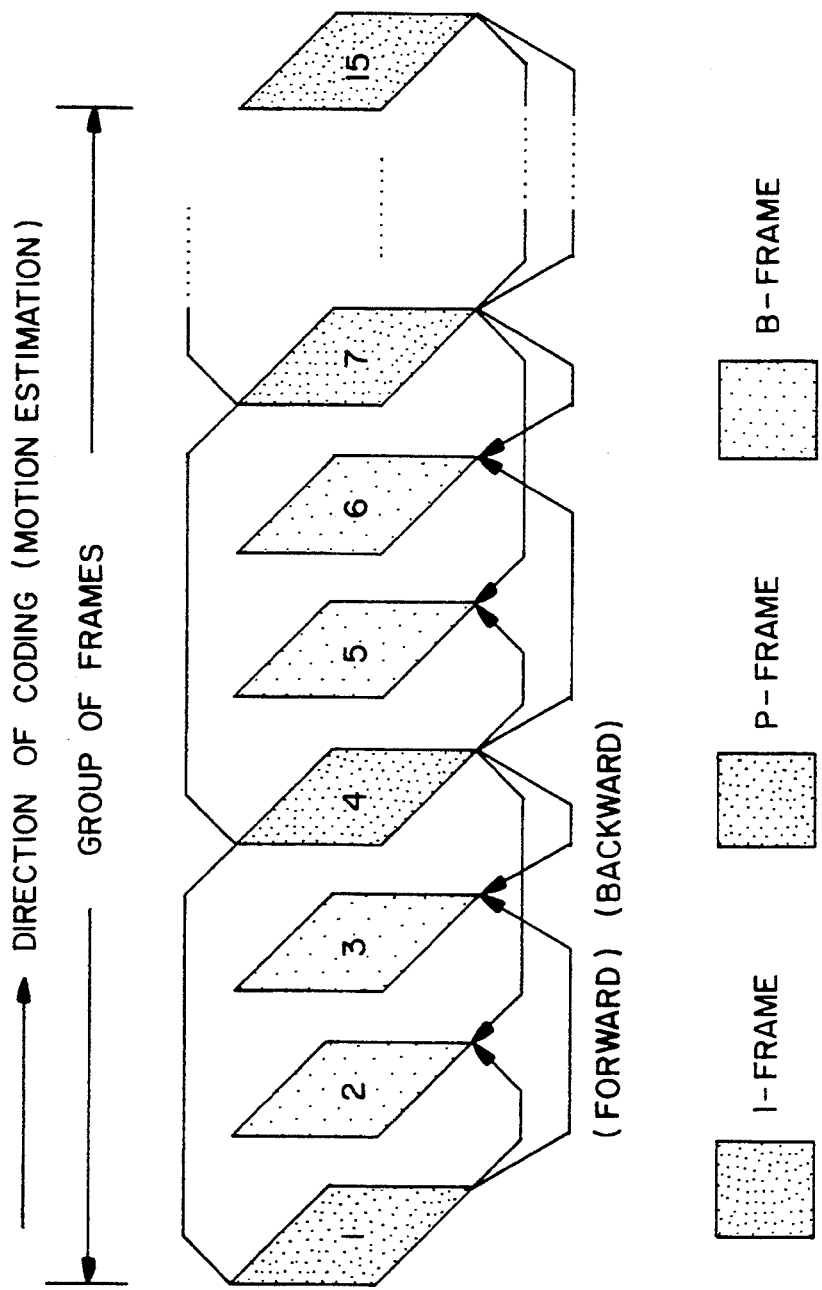
FIG. 5 is an explanatory drawing of an example arrangement and relationship of the I-picture, the P-picture, and the B-picture.

According to the prior art in motion, compensation (e.g. the MPEG Video Simulation Model Three, International Organization for Standardization, Coded Representation of Picture and Audio Information, 1990, ISO-IEC/JTC1/SC2/WG8 MPEG90/041), the frames, which can also be referred as pictures, in an interlaced scan video sequence can be classified in three ways: (1) intra-coded frames (or I-frames) wherein each frame is coded using information only from itself; (2) predictive-coded frames (or P-frames) wherein each frame is coded using motion compensated prediction from a past I or P-frame; and (3) bidirectionally predictive-coded frames (or B-frames)—wherein each frame is coded using motion compensated prediction from a past and/or future I or P-frame. An example arrangement of the three types of frames in a sequence is shown in FIG. 5. The number of P-frames in between the I-frames and the number of B-frames in between the I or P-frames are not necessarily 4 and 2 respectively. Other suitable numbers may be used in coding a sequence; for examples, there can be no B-frame or no B and P-frames at all.

Figure 1:
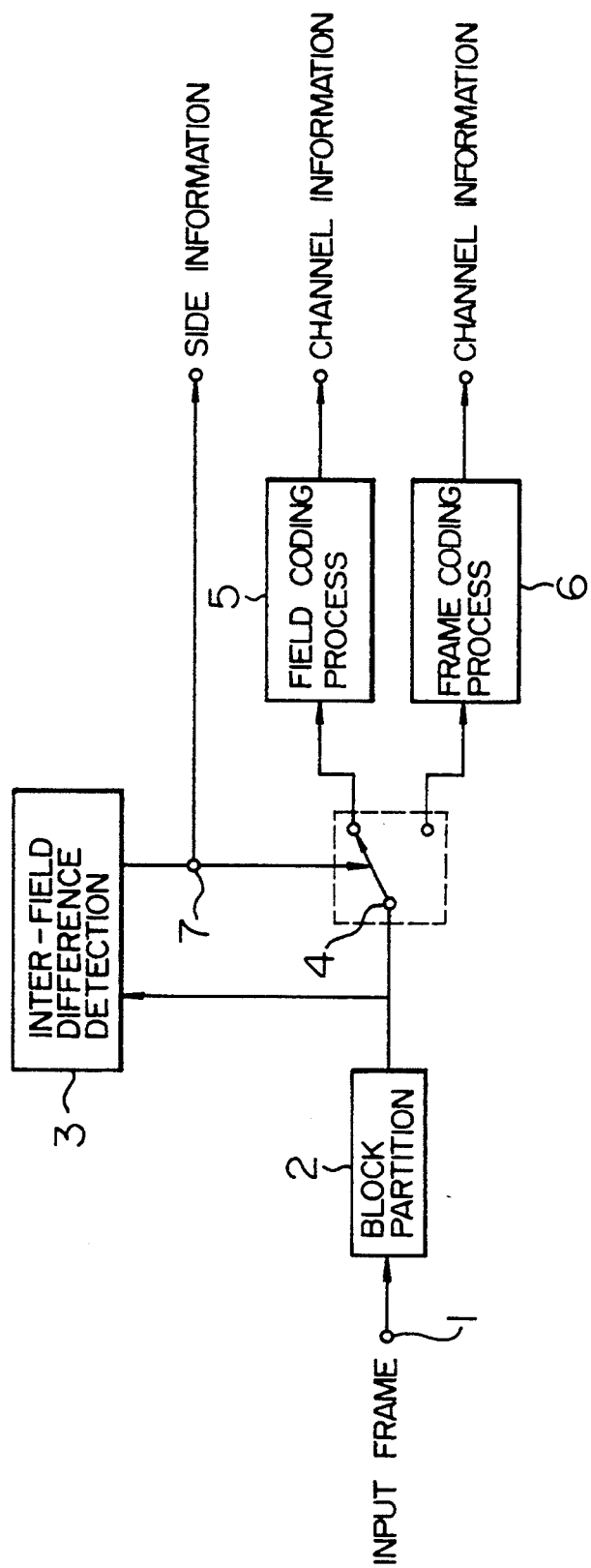
FIG. 1 is a block diagram of the interlaced scan video coding method in connection with one embodiment of the present invention.

FIG. 1 is a block diagram of an interlaced scan video signal coding apparatus using the method according to one embodiment of the present invention. An input frame 1 of a sequence is first partitioned into blocks of pixel data by the block partition process 2, and each of the blocks is subjected to an inter-field difference detection process 3 that examines the differences between the pixel data from the two fields within the block. One example of the inter-field difference detection process would be to calculate the meansquare error between the even and the odd line pairs of the block luminance area, and compare the calculated result to the meansquare error calculated between the consecutive odd line pairs and the consecutive even line pairs of the same area intra-field difference detection process; if the ratio of the square error between the even and odd line pairs over the square error between the consecutive odd line pairs and even line pairs is greater than a pre-defined threshold value, the block 4 will be coded by a field coding process 5; otherwise the said block will be coded by a frame coding process 6. The ratio of the two calculated square errors can also be compared to a multiple of thresholds depending on the block activity to achieve better detection. An example inter-field difference detection process implemented as a 'C' program procedure for a block size of 16×16 pixels can be given by:

```
Interfield_Difference_Detection (block)
   int      block[BlockHeight][BlockWeidth];{
   int      i,j;
   int      dif1, dif2, err1, err2, ratio;
   err1 =   0;
   for (i=0; i<BlockHeight; i+ =2)
        for (j=0; j<BlockWidth; j+ +){
            /*  Inter-Field Difference */
            dif1 = b[i][j] − b[i+1][j];
            err1 + = dif1*dif1;
        }
   err2 = 0;
   for (i=0; i<BlockHeight; i+ =4)
        for (j=0; j<BlockWidth; j+ +){
            /*  Inter-Field Difference */
            dif1 b[i][j] − b[i+2][j];
            dif2 = b[i+1][j] − b[i+3][j];
            err2 + = (dif1*dif1) + (dif2*dif2);
        }
   ratio = (err1*10)/err2;
   if((err1>100000)&&(ratio>12))
   return (FieldCodingProcess);
   else if ((err1>8000)&&(ratio>18))
   return (FieldCodingProcess);
   else if (ratio>30) return (FieldCodingProcess);
   else return (FrameCodingProcess);
}
```

The block size, the threshold values of 12, 18, 30, and the activity values of 8000, 100000 of the above 'C' program example can also be adjusted or expanded to other suitable values if needed. The result 7 of the inter-field difference detection process is coded as side information.

Figure 2:
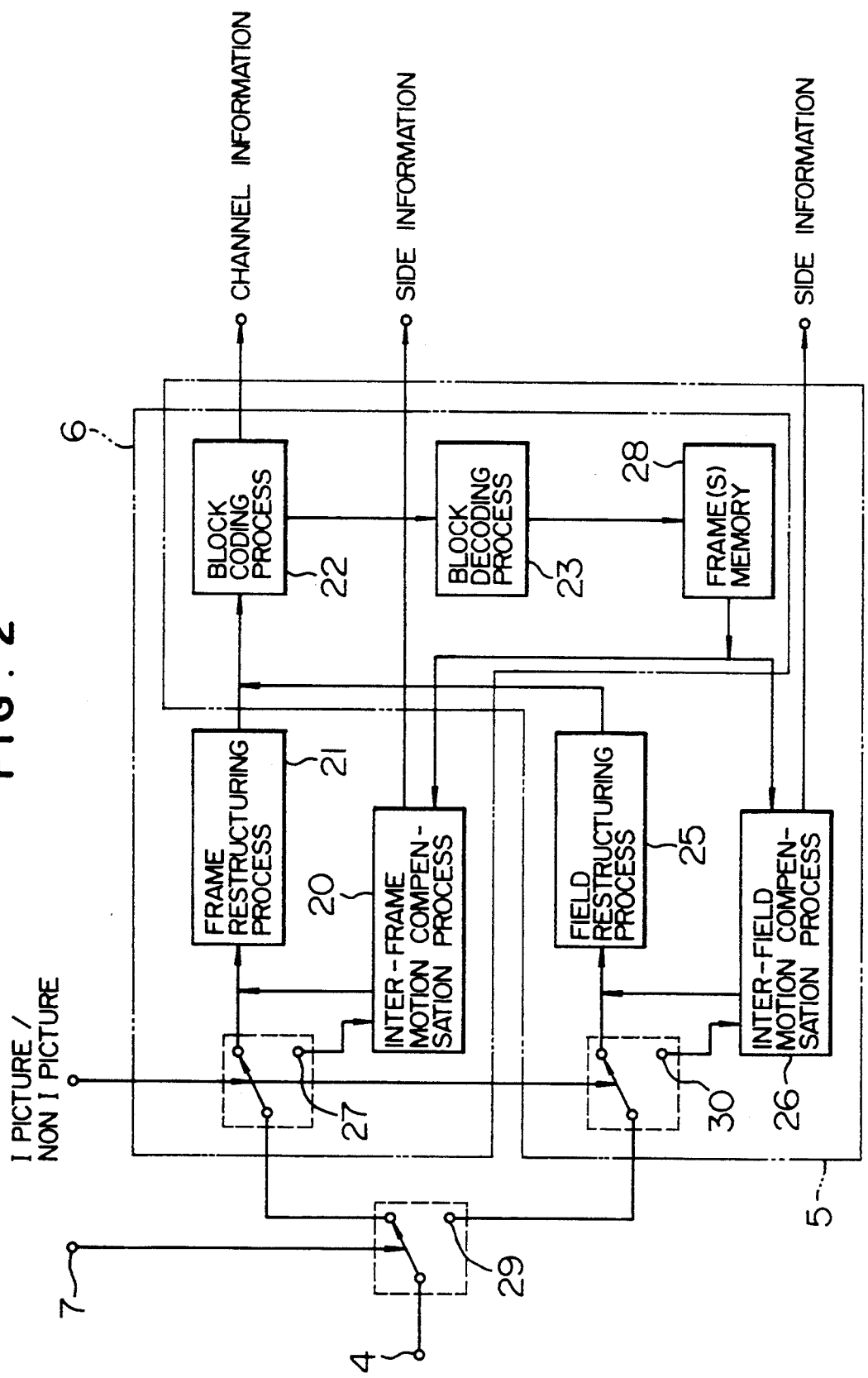
FIG. 2 is a block diagram of the frame coding process and the field coding process illustrating part of the embodiment of the present invention.

An example embodiment of an apparatus performing the frame coding process 6 and the field coding process 5 is illustrated in FIG. 2. In the frame coding process, the input block is subjected to an intra-frame coding process which comprises the frame restructuring process 21, the block coding process 22, and the block decoding process 23 if the input frame is an I-frame, or subjected to an inter-frame coding process which comprises the inter-frame motion compensation process 20, the frame restructuring process 21, the block coding process 22, and the block decoding process 23 if the input frame is not an I-frame. Similarly, in the field coding process 5, the input block is subjected to an intra-field coding process which comprises the field restructuring process 25, the block coding process 22, and the block decoding process 23 if the input frame is an I-frame, or else subjected to an inter-field coding process which comprises of the inter-field motion compensation process 26, the field restructuring process 25, the block coding process 22, and the block decoding process 23. The frame(s) memory 28 stores reconstructed frames from the results of the block decoding process 23, and it will be used by the inter-frame or inter-field motion compensation process (20, 26) of the input blocks from the frame to be coded.

Figure 3:
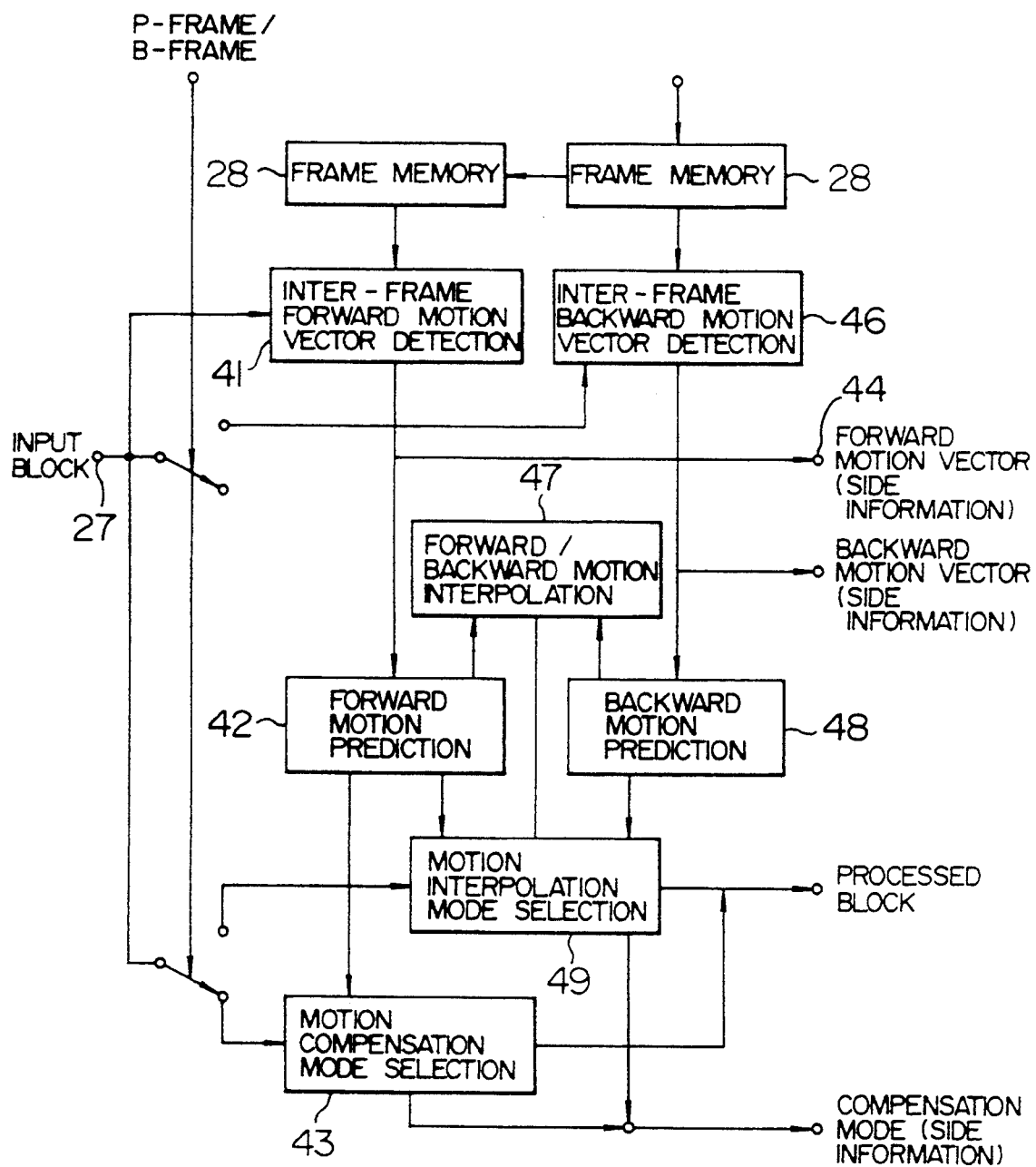
FIG. 3 is a block diagram of the inter-frame motion compensation process illustrating part of the embodiment of the present invention.

FIG. 3 is the apparatus block diagram of one embodiment of the inter-frame motion compensation process. Depending on the input frame type, the input block 27 to the inter-frame motion compensation process can be subjected to one of the motion compensation process; the inter-frame motion prediction process if the input frame is a P-frame, or the inter-frame motion interpolation process if the input frame is a B-frame. In the inter-frame motion prediction process, the input block is subjected to an inter-frame forward motion vector detection process 41 to estimate a forward motion vector 44. Conventional block matching techniques may be used in detecting the motion vector. Forward motion prediction process 42 is then performed, which basically obtains a forward motion displaced block from the previously coded frame using the detected forward motion vector. Finally, the result of the forward motion prediction process 42 is compared to the input block 27 in the motion compensation mode selection process 43 to decide which one of the two blocks should be coded since motion compensation may not always be successful, especially in regions with very fast changes in the video sequence. If the input block is decided to be coded, the actual value of the input block will be coded; else, the difference of the input block and the forward motion displaced block, i.e. the forward motion compensated block, will be coded. An example procedure in C Language of the motion compensation mode selection process is:

```
Motion_Compensation_Mode_Select (block,
motion_displaced_block)
    block[BlockHeight][Blockwidth];
    motion_displaced_block[BlockHeight][BlockWidth];{
    int      i,j;
    int      dif, org, com, var, varorg, mworg;
    int      npixel;
    npixel = BlockWidth*BlockHeight;
    var = varorg = mworg = 0;
    for (i=0; i<BlockHeight; i++){
        for (j=0, j<BlockWidth; j++){
            org = block[i][j];
            com = motion_displaced_block[i][j];
            dif = org − com;
            var += dif*dif;
            varorg += org*org;
            mwrog += org;
        }
    }
    var = var/npixel;
    varorg = varorg/npixel − mwrog/npixel*mwrog*npixel;
```

```
    if ((var>64)&&(var>varorg){
        return (code_input_block);}
    else {return (code_motion_compensated_block);}
}
```

The inter-frame motion interpolation process comprises the processes of inter-frame forward motion vector detection 41, inter-frame backward motion vector detection 46, forward motion prediction 42, forward-/backward motion interpolation 47, backward motion prediction 48, and the motion interpolation mode selection 49. With reference to the past and future I or P-frame (coded or not coded frames may be used), the inter-frame forward and backward motion vector detection processes estimate a forward motion vector and a backward motion vector by using conventional block matching techniques. With the two estimated motion vectors, the forward motion displaced block and the backward motion displaced block are found by forward and backward motion prediction processes (42 & 48) in the same way mentioned before. The forward/backward motion interpolation process 47 calculates the forward/backward motion interpolated block by averaging the forward and the backward motion displaced block. Weighting or no weighting based on the frame distances may be used when averaging the forward and backward motion displaced blocks. The above three mentioned motion displaced and interpolated blocks are compared together with the input block 27 at the motion interpolation mode selection process 49 to determine which block is to be coded. One method of determining which block is to be coded is by comparing the mean square errors described in the MPEG Video Simulation Model Three, International Organization for Standardization, Coded Representation of Picture and Audio Information, 1990, ISO-IEC/JTC1/SC2/WG8 MPEG90/041. If the determined block is not the input block, the difference of the determined block and the input block will be coded.

Figure 4:
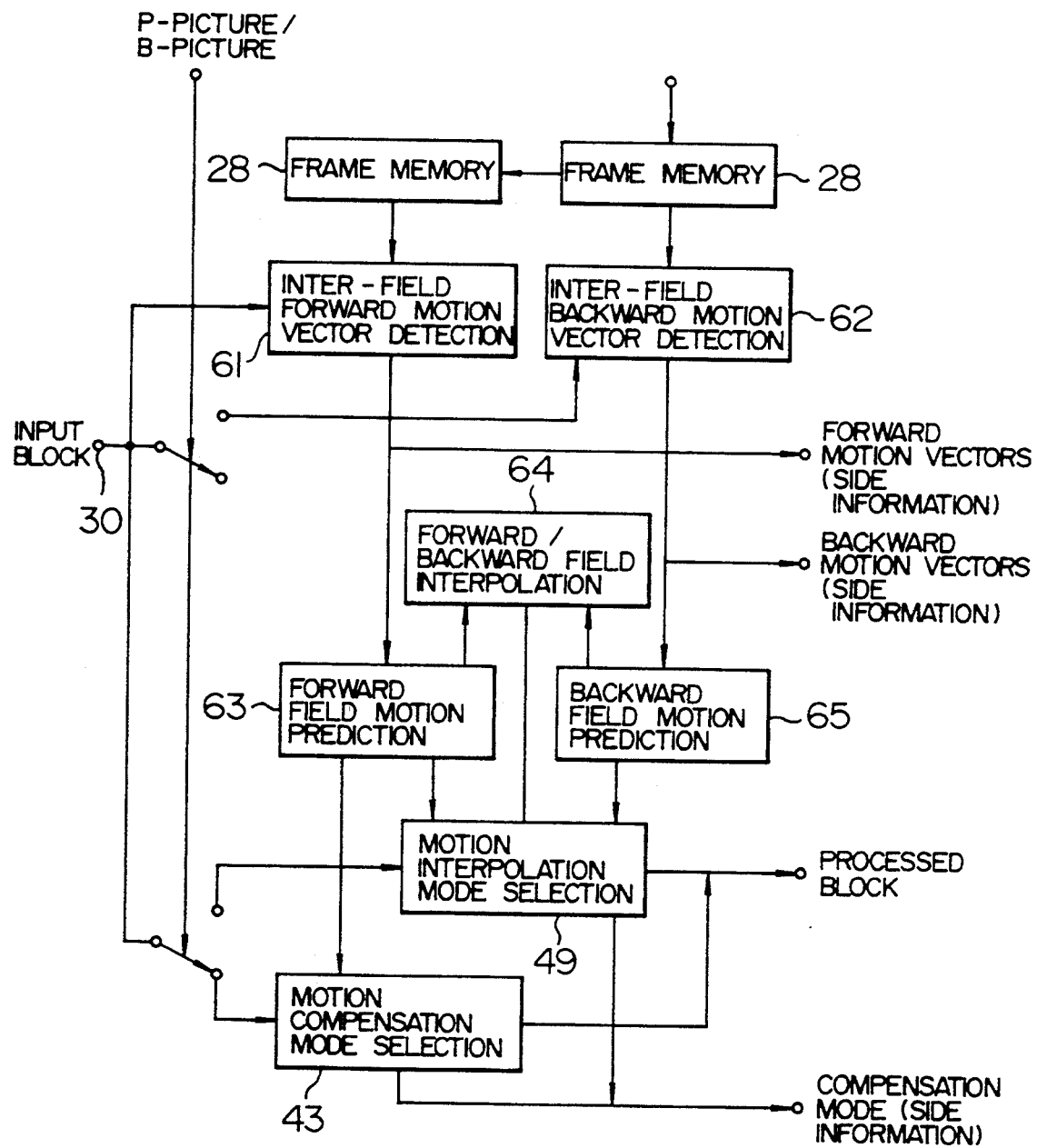
FIG. 4 is a block diagram of the inter-field motion compensation process illustrating part of the embodiment of the present invention.

Data of the two fields in the input block 29 (see FIG. 2) to the field coding process 5 is generally uncorrelated or contains motion as selected by the inter-field difference detection process 3; therefore, an inter-field motion compensation process 26 which performs independently motion compensation on the data from the two fields is selected. The example embodiment of the inter-field motion compensation process shown in FIG. 4 is, however, very similar to the inter-frame motion compensation process (FIG. 3) except for the motion vector detection processes and the construction of the motion displaced block. In the inter-field forward/backward motion vector detection process 61 and 62, one motion vector will be estimated for each of the field in the input block 30, and in the forward and backward directions; hence, the forward motion vector 1 and 2, and backward motion vector 1 and 2 are to be estimated. Based on the estimated motion vector 1 and 2, two motion displaced fields of the block are obtained from previous coded pictures to form the motion displaced block and also the motion interpolated block in processes 63, 64, 65. The mode selection processes 43 and 49 are the same processes used in the inter-frame motion compensation process 20. Regarding the coding of the forward motion vector 1 and 2, or backward motion vector 1 and 2, as the difference in motion in the two fields within the input block and between previous neighboring coded block is not expected to be high, an efficient way of coding is to delta code the motion vector (forward and/or backward) or one field with reference to the previous coded block, and the delta difference of the motion of the two fields within the input block.

Figure 6A:
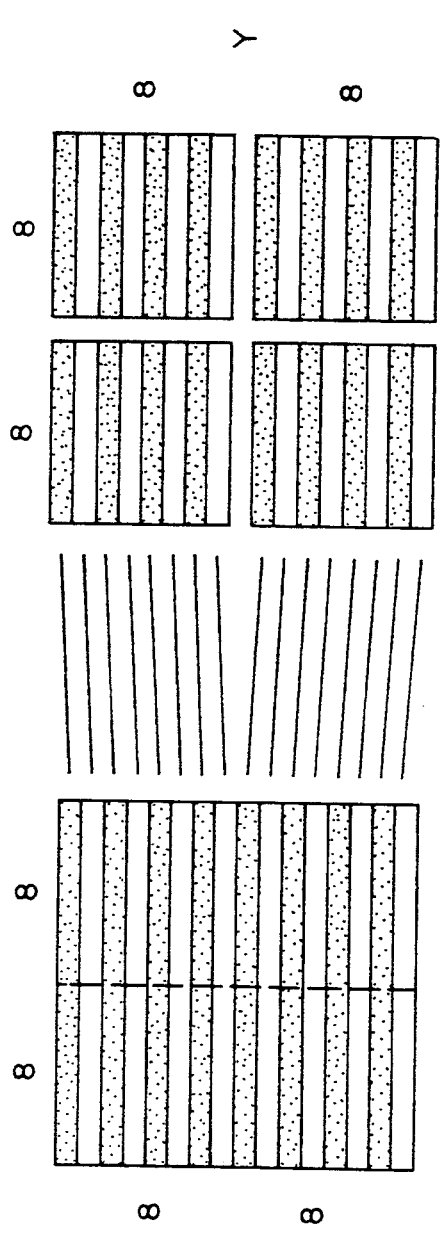
FIG. 6A is an explanatory drawing illustrating an example effect of the frame restructuring process.
Figure 6B:
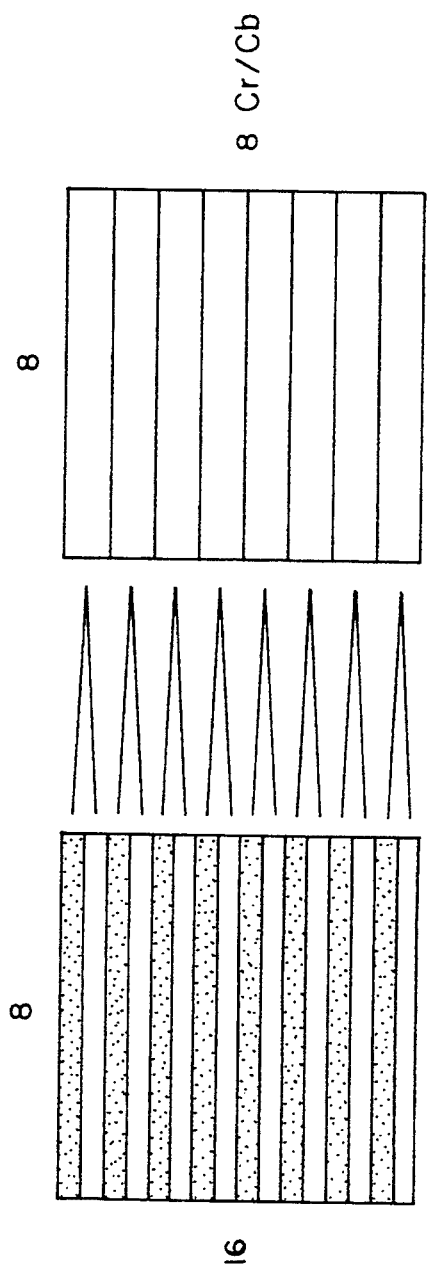
FIG. 6B is an explanatory drawing illustrating an example intra-frame sub-sampling process for the chrominance data.

The input block 4 or the output of the inter-frame motion compensation process is subjected to the frame restructuring process (numeral 21 of FIG. 2) where it is spatially partitioned into smaller sub-blocks suitable for a block coding process for example based on the DCT (Discrete Cosine Transformation) method. FIG. 6A is an example of a 16×16 block of luminance data (Y) partitioned in such a way into 4 smaller 8×8 sub-blocks. The interlaced fields in the frame restructuring process are not separated in order to allow the block coding process to take advantage of the correlation between the fields. The frame restructuring process can further comprise an intra-frame sub-sampling process which reduces the resolution of the chrominance information (Cr/Cb). Referring to FIG. 6B, an example of an 8×16 chrominance block (co-sited with a 16×16 luminance block in a 4:2:2 source) is intra-frame sub-sampled to an 8×8 chrominance sub-block by averaging each even and odd line pair of the chrominance block. Such sub-sampling of the chrominance signal is done to reduce the amount of information needs to be coded without generating visible differences.

Figure 7A:
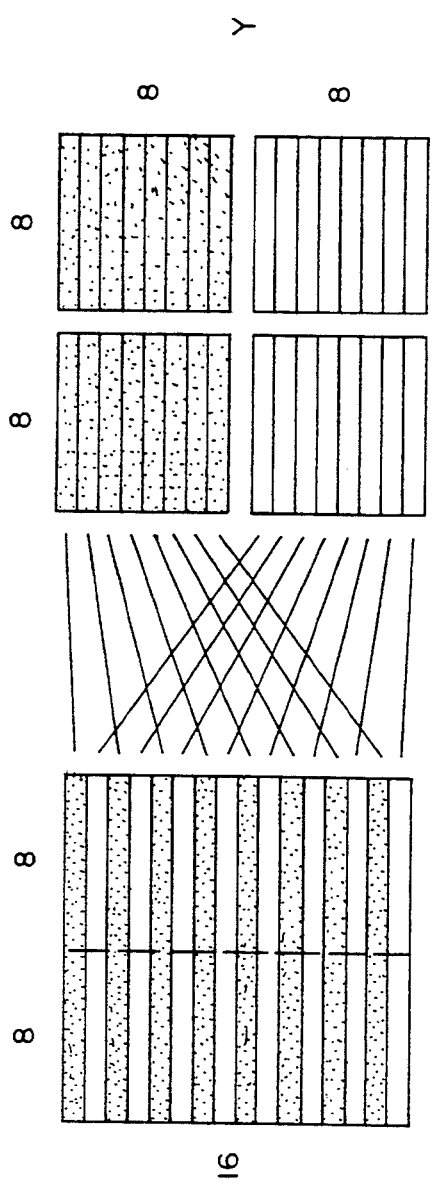
FIG. 7A is an explanatory drawing illustrating an example effect of the field restructuring process.
Figure 7B:
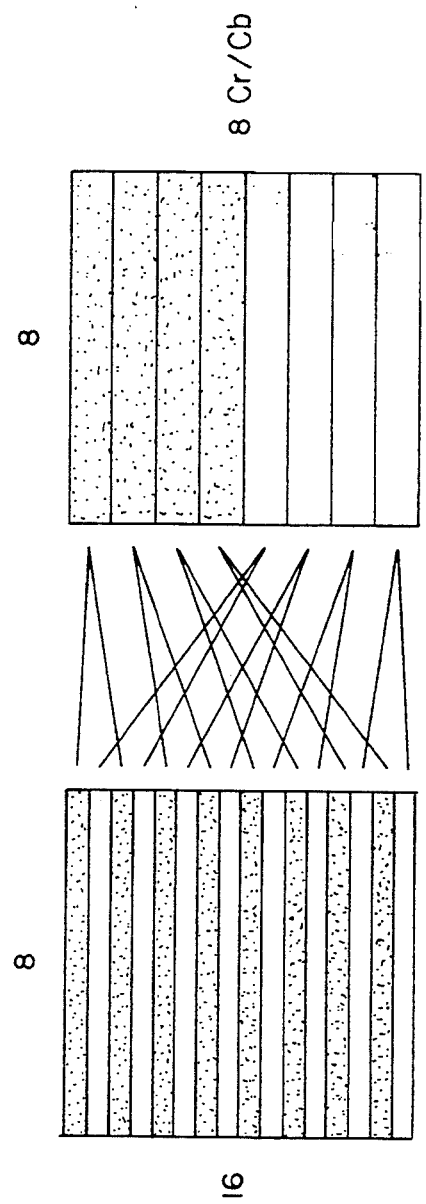
FIG. 7B is an explanatory drawing illustrating an example intra-field sub-sampling process for the chrominance data.

The field restructuring process (numeral 25 of FIG. 2) accepts the result from the inter-field motion compensation process (numeral 26 of FIG. 2) or the input block 4. The process partitions the luminance data (Y) of an input into smaller sub-blocks with the two fields separated. FIG. 7A shows the such a process of partitioning of a 16×16 input luminance block into four 8×8 sub-blocks, two of which contain the even field data and the other two contain the odd field data. This is done so that the block coding process (numeral 22 of FIG. 2) would take advantage of the higher correlation within the field in each sub-block. The field restructuring process may further comprise an intra-field sub-sampling process which reduces the resolution of the chrominance information (Cr/Cb) in each field. Referring to FIG. 7B, an example of an 8×16 chrominance block is intra-field sub-sampled to an 8×8 chrominance sub-block by separately averaging every two consecutive lines in each field. The averaged lines may be rearranged such that the two fields are separated in the output sub-block. The averaged lines may also be arranged in the interlaced way in the output sub-block, but the resultant coding efficiency was found not to be as good as the previous mentioned way.

Figure 8:
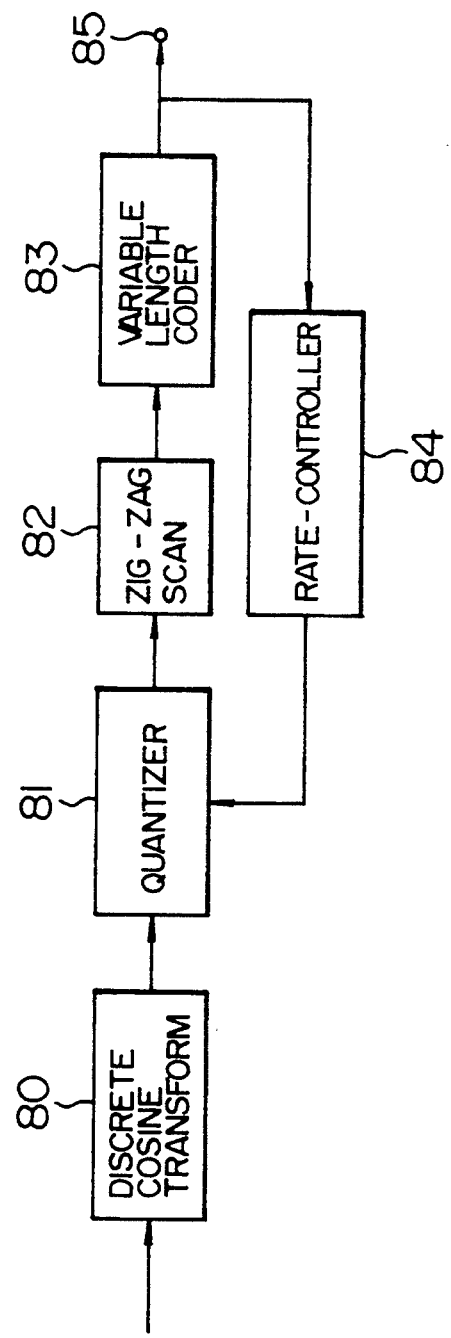
FIG. 8 is a block diagram of the block coding process in connection with part of one embodiment of the present invention.

Each sub-block produced by the frame or field restructuring process is subjected to a block coding process (numeral 22 of FIG. 2) for data compaction by exploring correlations in the sub-block. An embodiment of the block coding apparatus is shown in FIG. 8 which comprises the means for discrete cosine transforming (DCT) 80 of the sub-block into DCT coefficients; quantizing 81 the DCT coefficients based on a rate-controller 84 that monitors the amount of output information 85; zig-zag scanning 82 the quantized DCT coefficients; variable length coding (VLC) 83 the result of the zig-zag scanning and all necessary side information describing the sub-block to produce the encoded information 85 for digital storage media or transmission media. An example implementation of the block coding process illustrated in FIG. 8 can be found in detail in the MPEG Video Simulation Model Three, International Organization for Standardization, Coded Representation of Picture and Audio Information, 1990, ISO-IEC/JTC1/SC2/WG8 MPEG90/041.

Figure 9:
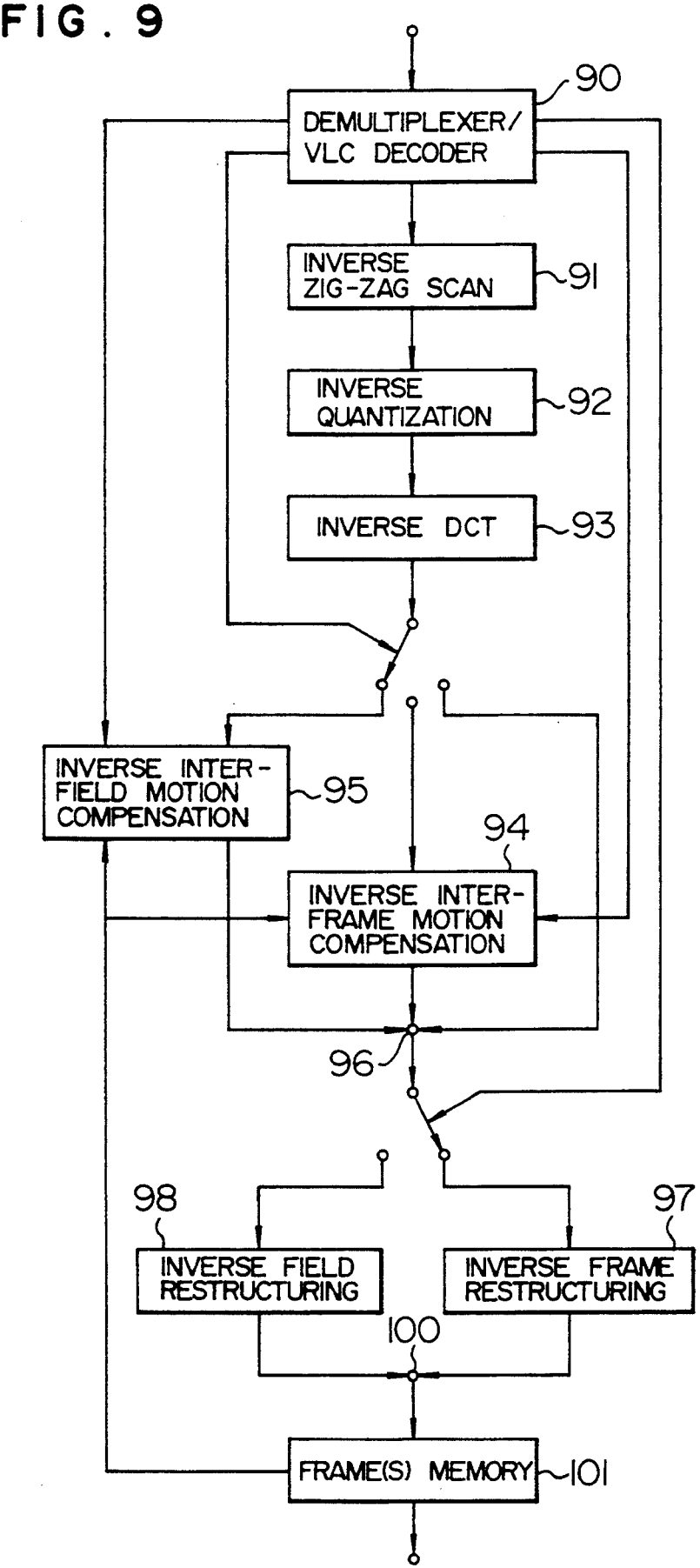
FIG. 9 is a block diagram of the block decoding process in one embodiment of the present invention.

The block decoding process (numeral 23 of FIG. 2) decodes the output of the block coding process (numeral 22 of FIG. 2), and reconstructs the frames. The frames reconstructed by the block decoding process are placed in the frame memory (numeral 28 of FIG. 2) for use by the inter-frame/inter-field motion compensation processes (numeral 20 & 26 of FIG. 2). The block decoding process is also used to decode the encoded information from digital storage media or transmission media that is created by the block encoding process and/or the motion compensation process. FIG. 9 is an embodiment of the block decoding apparatus, corresponding to the block coding process described in FIG. 8, which comprises means for demultiplexing/VLC decoding 90 the encoded information to reproduce the zig-zag scanned sub-block and the included side information; inverse zig-zag scanning 91 followed by inverse quantizing 92 of the said sub-block to reproduce the DCT coefficients; inverse DCT 93 of said coefficients; subjecting the result of the inverse DCT to an inverse of the inter-frame or inter-field motion compensation process (FIGS. 3 & 4) 94 & 95 according to the coded picture type (I, P or B-frame) and the coded result of the inter-field difference detection process (numeral 3 of FIG. 1) to reproduce the reconstructed sub-block 96; reversing of the frame/field restructuring process 97 & 98 according to the coded result of the inter-field difference detection process to reproduce the reconstructed block 100 which can then be placed into the frame memory 101 for the inverse motion compensation process 94 or 95 or for display onto a monitor screen. The demultiplexer/VLC decoder and the inverse zig-zag scanner may be omitted if the block decoding process is to be used in conjunction with the block encoding process in the video signal encoder as the input to the inverse quantizer and other side information may be obtained from the corresponding processes in the block coding process directly.

As described above, the input frame is partitioned into smaller blocks of pixel data where the two fields in each block is examined for correlation. If the difference between the two fields in the block is low (or the correlation is high), the block will be coded with a frame coding process that assumes all lines in the block are progressive scanned, and therefore, with efficient inter-frame motion compensation process and chrominance data intra-frame sub-sampling process designed. On the other hand, if the difference between the two fields in the block is high (or the correlation is low), the block will be coded with a field coding process where more emphasis is made on exploring correlation within each field (intra-field) and correlation of each field and its neighboring fields (inter-field); furthermore, intra-field sub-sampling of the chrominance data is better performed in such blocks. In general video sequences, the level of correlation within each picture frame differs between regions that contain stationary scene or objects and regions that contain moving scene or objects; therefore, the present invention provides an effect of more efficient or adaptive coding the two types of regions with methods that are more optimal to each the of regions. In a fixed bit-rate video coding system, the present invention provides an effect of better reconstructed picture quality.

What is claimed is:

1. A method of coding an interlaced scan digital video signal comprising the steps of:
   (a) partitioning each frame of said interlaced scan digital video signal into blocks of pixel data;
   (b) determining a difference of pixel values of two fields within each of said blocks of pixel data;
   said step (b) of determining a difference of pixel values of two fields comprising
      (i) calculating a mean square error between a line pair comprising an even and an adjacent odd line of a respective block of said blocks of pixel data,
      (ii) calculating a mean square error between consecutive odd line pairs and consecutive even line pairs of said respective block, and
      (iii) comparing the two calculated mean square errors; and
   (c) subjecting each of said blocks of pixel data, according to said difference, (i) to a field coding process where at least one of an intra-field correlation or an inter-field correlation is used to achieve information compaction, or (ii) to a frame coding process where at least one of an intra-frame correlation or an inter-frame correlation is used to achieve information compaction.

2. A method of coding an interlaced scan digital video signal comprising the steps of:
   (a) partitioning each frame of said interlaced scan digital video signal into blocks of pixel data;
   (b) determining a difference of pixel values of two fields within each respective block of said blocks of pixel data; and
   (c) subjecting each of said blocks of pixel data, according to said difference, (1) to a field coding process where at least one of an intra-field correlation or an inter-field correlation is used to achieve information compaction, or (2) to a frame coding process where at least one of an intra-frame correlation or an inter-frame correlation is used to achieve information compaction, said frame coding process comprising the steps of:
      (i) determining whether or not said respective block of said blocks of pixel data needs to be subjected to an inter-frame motion compensation process and generating a first determined result,
      (ii) subjecting said respective block, according to the first determined result, to said inter-frame motion compensation process where an inter-frame correlation is used to reduce an amount of information which needs to be coded in said respective block,
      (iii) subjecting (1) said respective block or (2) a result of the inter-frame motion compensation process, according to the first determined result, to a frame restructuring process so as to spatially partition said respective block or said result into smaller sub-blocks, and
      (iv) subjecting said sub-blocks to a block coding process where information in each sub-block is compressed.

3. A method according to claim 2, wherein the inter-frame motion compensation process comprises the steps of:
   determining whether to subject said respective block
      (i) to an inter-frame motion prediction process or
      (ii) to an inter-frame motion interpolation process and generating a second determined result;
   selectively subjecting said respective block, according to the second determined result, to said inter-frame motion prediction process where a forward motion vector is detected with reference to a previous coded frame, wherein motion compensation is performed on said respective block using the detected forward motion vector so as to generate a motion compensated block, and comparing the motion compensated block with said respective block; and
   selectively subjecting said respective block, according to the second determined result, to said inter-frame motion interpolation process where a forward motion vector is detected with reference to a previous coded frame, a backward motion vector is detected with reference to a future coded frame, including performing three motion compensations respectively using the detected forward motion vector, the detected backward motion vector, and both the detected forward and backward motion vectors, and performing comparisons between results of the three motion compensation together with said respective block.

4. A method according to claim 3, wherein the block coding process comprises the steps of:
   discrete cosine transforming each of said sub-blocks into DCT coefficients;
   quantizing the DCT coefficients;
   zig-zag scanning the quantized DCT coefficients;
   variable length coding (VLC) the result of the zig-zag scanning to produce encoded information.

5. A method according to claim 4, further comprising a block decoding process comprising the steps of:
   demultiplexing/VLC decoding the encoded information to reproduce the zig-zag scanned sub-blocks and included side information describing the sub-blocks;
   inverse zig-zag scanning said sub-blocks followed by inverse quantizing of said sub-blocks to reproduce the DCT coefficients;
   inverse DCT processing said coefficients and producing a result;
   subjecting the result of the inverse DCT processing to one of inverse inter-frame motion compensation processing and inverse inter-field motion compensation processing, according to (i) a coded picture type (I, P or B-picture) of said encoded information and (ii) a coded result of said step (b) to reproduce the sub-blocks; and
   inverting the frame restructuring process according to the coded result of said step (b) to reproduce the respective block.

6. A method according to claim 2, wherein the frame restructuring process further comprises the step of subjecting said sub-blocks that contain chrominance information to an intra-frame sub-sampling process to reduce resolution.

7. A method according to claim 2, wherein the block coding process comprises the steps of:
   discrete cosine transforming (DCT) each of said sub-blocks into DCT coefficients;
   quantizing the DCT coefficients;
   zig-zag scanning the quantized DCT coefficients;
   variable length coding (VLC) the result of the zig-zag scanning to produce encoded information.

8. A method according to claim 7, further comprising a block decoding process comprising the steps of:
   demultiplexing/VLC decoding the encoded information to reproduce the zig-zag scanned sub-blocks and included side information describing the sub-blocks;

inverse zig-zag scanning said sub-blocks, followed by inverse quantizing of said sub-blocks to reproduce the DCT coefficients;

inverse DCT processing said coefficients and producing a result;

subjecting the result of the inverse DCT processing to one of inverse inter-frame motion compensation processing and inverse inter-field motion compensation processing, according to (i) a coded picture type (I, P or B-picture) of said encoded information and (ii) a coded result of said step (b) to reproduce the sub-blocks; and inverting the frame restructuring process according to the coded result of said step (b) to reproduce the respective block.

9. A method according to claim 7, wherein said step (b) comprises:
(i) determining an inter-field difference and an intra-field difference of pixel values of two fields within each respective block of said blocks of pixel data before subjecting said blocks of pixel data to coding processing, and
(ii) comparing said inter-field difference and said intra-field difference to obtain said difference of said step (b).

10. A method according to claim 2, wherein said step (b) comprises:
(i) determining an inter-field difference and an intra-field difference of pixel values of two fields within each respective block of said blocks of pixel data before subjecting said blocks of pixel data to coding processing, and
(ii) comparing said inter-field difference and said intra-field difference to obtain said difference of said step (b).

11. A method of coding an interlaced scan digital video signal comprising the steps of:
(a) partitioning each frame of said interlaced scan digital video signal into blocks of pixel data;
(b) determining a difference of pixel values of two fields within each respective block of said blocks of pixel data; and
(c) subjecting each of said blocks of pixel data, according to said difference, (1) to a field coding process where at least one of an intra-field correlation or an inter-field correlation is used to achieve information compaction, or (2) to a frame coding process where at least one of an intra-frame correlation or an inter-frame correlation is used to achieve information compaction, said field coding process comprising the steps of:
(i) determining whether or not said respective block of said blocks of pixel data needs to be subjected to an inter-field motion compensation process and generating a first determined result,
(ii) subjecting said respective block, according to the first determined result, to said inter-field motion compensation process where an inter-field correlation is used to reduce the amount of information needed to be coded in said respective block,
(iii) subjecting (1) said respective block or (2) a result of the inter-field motion compensation process, according to the first determined result, to a field restructuring process where even lines and odd lines of said respective block are separated into smaller sub-blocks, and subjecting said sub-blocks to a block coding process where information in each sub-block is compressed.

12. A method according to claim 11, wherein the inter-field motion compensation process comprises the steps of:
determining whether to subject said respective block (i) to an inter-field motion prediction process or (ii) to an inter-field motion interpolation process and generating a second determined result;
selectively subjecting said respective block, according to the second determined result, to said inter-field motion prediction process where a first forward motion vector is detected with reference to a previous coded field for even lines of said respective block, a second forward motion vector is detected with reference to a previous coded field for odd lines of said respective block, a motion compensation is performed using the detected first and second forward motion vectors so as to generate a motion compensated block, and the motion compensated block is compared with said respective block;
selectively subjecting said respective block, according to the second determined result, to said inter-field motion interpolation process where first and second forward motion vectors are detected with reference to previous coded fields for the even and odd lines of said respective block, respectively, first and second backward motion vectors are detected with reference to future coded fields for the even and odd lines of said respective block, respectively, three motion compensations are performed by respectively using the detected first and second forward motion vectors, the first and second backward motion vectors, and the first and second forward and backward motion vectors, and including performing comparisons between results of the three motion compensation together with said respective block.

13. A method according to claim 12, wherein the block coding process comprises the steps of:
discrete cosine transforming (DCT) each of said sub-blocks into DCT coefficients;
quantizing the DCT coefficients;
Zig-zag scanning the quantized DCT coefficients;
variable length coding (VLC) the result of the zig-zag scanning to generate encoded information.

14. A method according to claim 13, further comprising a block decoding process comprising the steps of:
demultiplexing/VLC decoding the encoded information to reproduce the zig-zag scanned sub-blocks and included side information describing the sub-blocks;
inverse zig-zag scanning said sub-blocks followed by inverse quantizing of the sub-blocks to reproduce the DCT coefficients;
inverse DCT processing said coefficients and generating result;
subjecting the result of the inverse DCT processing to one of inverse inter-frame motion compensation processing and inverse inter-field motion compensation processing, according to (i) a coded picture type (I, P or B-picture) of the encoded information and (ii) a coded result of said step (b) to reproduce the sub-blocks; and inverting of the field restructuring process according to the coded result of said step (b) to reproduce the respective block.

15. A method according to claim 11, wherein the field restructuring process further comprises the step of:
subjecting said sub-blocks that contain chrominance information to an intra-field sub-sampling process to reduce resolution.

16. A method according to claim 11, wherein the block coding process comprises the steps of:
discrete cosine transforming (DCT) each of said sub-blocks into DCT coefficients;
quantizing the DCT coefficients;
zig-zag scanning the quantized DCT coefficients;
variable length coding (VLC) the result of the zig-zag scanning to produce encoded information.

17. A method according to claim 16, further comprising a block decoding process comprising the steps of:
demultiplexing/VLC decoding the encoded information to reproduce the zig-zag scanned sub-blocks and included side information describing the sub-blocks;
inverse zig-zag scanning said sub-blocks followed by inverse quantizing of the sub-blocks to reproduce the DCT coefficients;
inverse DCT processing said coefficients and producing result;
subjecting the result of the inverse DCT processing to one of inverse inter-frame motion compensation processing and inverse inter-field motion compensation processing, according to (i) a coded picture type (I, P or B-picture) and (ii) a coded result of said step (b) to reproduce the sub-blocks; and
inverting of the field restructuring process according to the coded result of said step (b) to reproduce the respective block.

18. A method according to claim 11, wherein said step (b) comprises:
(i) determining an inter-field difference and an intra-field difference of pixel values of two fields within each respective block of said blocks of pixel data before subjecting said blocks of pixel data to coding processing, and
(ii) comparing said inter-field difference and said intra-field difference to obtain said difference of said step (b).

19. An apparatus for coding an interlaced scan digital video signal comprising:
(a) means for partitioning each frame of said interlaced scan digital video signal into blocks of pixel data;
(b) means for determining a difference of pixel values of two fields within each of said blocks of pixel data;
said means (b) for determining a difference of pixel values of two fields comprising
(i) means for calculating a mean square error between a line pair comprising an even and an adjacent odd line of a respective block of said blocks of pixel data,
(ii) means for calculating a mean square error between consecutive odd line pairs and consecutive even line pairs of said respective block, and
(iii) means for comparing the two calculated mean square errors; and
(c) means for subjecting each of said blocks of pixel data, according to said difference, (i) to a field coding process where at least one of an intra-field correlation or an inter-field correlation is used to achieve information compaction, or (ii) to a frame coding process where at least one of an intra-frame correlation or an inter-frame correlation is used to achieve information compaction.

20. An apparatus for coding an interlaced scan digital video signal comprising:
(a) means for partitioning each frame of said interlaced scan digital video signal into blocks of pixel data;
(b) means for determining a difference of pixel values of two fields within each respective block of said blocks of pixel data; and
(c) means for subjecting each of said blocks of pixel data, according to said difference, (1) to a field coding process where at least one of an intra-field correlation or an inter-field correlation is used to achieve information compaction, or (2) to a frame coding process where at least one of an intra-frame correlation or an inter-frame correlation is used to achieve information compaction, said frame coding process comprising:
(i) determining whether or not said respective block of said blocks of pixel data needs to be subjected to an inter-frame motion compensation process and generating a first determined result,
(ii) subjecting said respective block, according to the first determined result, to said inter-frame motion compensation process where an inter-frame correlation is used to reduce an amount of information which needs to be coded in said respective block,
(iii) subjecting (1) said respective block or (2) a result of the inter-frame motion compensation process, according to the first determined result, to a frame restructuring process so as to spatially partition said respective block or said result into smaller sub-blocks, and
(iv) subjecting said sub-blocks to a block coding process where information in each sub-block is compressed.

21. An apparatus according to claim 20, wherein said (c) means comprises means, for performing the inter-frame motion compensation process, comprising:
means for determining whether to subject said respective block (i) to an inter-frame motion prediction process or (ii) to an inter-frame motion interpolation process and generating a second determined result;
means for selectively subjecting said respective block, according to the second determined result, to said inter-frame motion prediction process where a forward motion vector is detected with reference to a previous coded frame, wherein motion compensation is performed on said respective block using the detected forward motion vector so as to generate a motion compensated block, and comparing the motion compensated block with said respective block; and
means for selectively subjecting said respective block, according to the second determined result, to said inter-frame motion interpolation process where a forward motion vector is detected with reference to a previous coded frame and a backward motion vector is detected with reference to a future coded frame, including performing three motion compensations respectively using the detected forward motion vector, the detected backward motion vector, and both the detected forward and backward motion vectors, and performing comparisons between results of the three motion compensation together with said respective block.

22. An apparatus according to claim 21, wherein said (c) means comprises means, for performing the block coding process, comprising:
means for discrete cosine transforming each of said sub-blocks into DCT coefficients;
means for quantizing the DCT coefficients;
means for zig-zag scanning the quantized DCT coefficients;
means for variable length coding (VLC) the result of the zig-zag scanning to produce encoded information.

23. An apparatus according to claim 22, further comprising means for performing a block decoding process comprising:
means for demultiplexing/VLC decoding the encoded information to reproduce the zig-zag scanned sub-blocks and included side information describing the sub-blocks;
means for inverse zig-zag scanning said sub-blocks followed by inverse quantizing of said sub-blocks to reproduce the DCT coefficients;
means for inverse DCT processing said coefficients and producing a result;
means for subjecting the result of the inverse DCT processing to one of inverse inter-frame motion compensation processing and inverse inter-field motion compensation processing, according to (i) a coded picture type (I, P or B-picture) of said encoded information and (ii) a coded result of said (b) means to reproduce the sub-blocks; and
means for inverting the frame restructuring process according to the coded result of said (b) means to reproduce the respective block.

24. An apparatus according to claim 20, wherein the frame restructuring process performed by said (c) means further comprises the step of subjecting said sub-blocks that contain chrominance information to an intra-frame sub-sampling process to reduce resolution.

25. An apparatus according to claim 20, wherein said (c) means comprises means, for performing the block coding process, comprising:
means for discrete cosine transforming (DCT) each of said sub-blocks into DCT coefficients;
means for quantizing the DCT coefficients;
means for zig-zag scanning the quantized DCT coefficients;
variable length coding (VLC) the result of the zig-zag scanning to produce encoded information.

26. An apparatus according to claim 25, further comprising means for performing a block decoding process comprising:
means for demultiplexing/VLC decoding the encoded information to reproduce the zig-zag scanned sub-blocks and included side information describing the sub-blocks;
means for inverse zig-zag scanning said sub-blocks, followed by inverse quantizing of said sub-blocks to reproduce the DCT coefficients;
means for inverse DCT processing said coefficients and producing a result;
means for subjecting the result of the inverse DCT processing to one of inverse inter-frame motion compensation processing and inverse inter-field motion compensation processing, according to (i) a coded picture type (I, P or B-picture) of said encoded information and (ii) a coded result of said (b) means to reproduce the sub-blocks; and
means for inverting the frame restructuring process according to the coded result of said (b) means to reproduce the respective block.

27. An apparatus according to claim 25, wherein said (b) means comprises:
(i) means for determining an inter-field difference and an intra-field difference of pixel values of two fields within each respective block of said blocks of pixel data before subjecting said blocks of pixel data to coding processing, and
(ii) means for comparing said inter-field difference and said intra-field difference to obtain said difference of said (b) means.

28. An apparatus according to claim 20, wherein said (b) means comprises:
(i) means for determining an inter-field difference and an intra-field difference of pixel values of two fields within each respective block of said blocks of pixel data before subjecting said blocks of pixel data to coding processing, and
(ii) means for comparing said inter-field difference and said intra-field difference to obtain said difference of said (b) means.

29. An apparatus for coding an interlaced scan digital video signal comprising:
(a) means for partitioning each frame of said interlaced scan digital video signal into blocks of pixel data;
(b) means for determining a difference of pixel values of two fields within each respective block of said blocks of pixel data; and
(c) means for subjecting each of said blocks of pixel data, according to said difference, (1) to a field coding process where at least one of an intra-field correlation or an inter-field correlation is used to achieve information compaction, or (2) to a frame coding process where at least one of an intra-frame correlation or an inter-frame correlation is used to achieve information compaction, said field coding process comprising:
(i) determining whether or not said respective block of said blocks of pixel data needs to be subjected to an inter-field motion compensation process and generating a first determined result,
(ii) subjecting said respective block, according to the first determined result, to said inter-field motion compensation process where an inter-field correlation is used to reduce the amount of information needed to be coded in said respective block,
(iii) subjecting (1) said respective block or (2) a result of the inter-field motion compensation process, according to the first determined result, to a field restructuring process where even lines and odd lines of said respective block are separated into smaller sub-blocks, and
(iv) subjecting said sub-blocks to a block coding process where information in each sub-block is compressed.

30. An apparatus according to claim 29, wherein said (c) means comprises means, for performing the inter-field motion compensation process, comprising:
means for determining whether to subject said respective block (i) to an inter-field motion prediction process or (ii) to an inter-field motion interpolation process and generating a second determined result;

means for selectively subjecting said respective block, according to the second determined result, to said inter-field motion prediction process where a first forward motion vector is detected with reference to a previous coded field for even lines of said respective block, a second forward motion vector is detected with reference to a previous coded field for odd lines of said respective block, a motion compensation is performed using the detected first and second forward motion vectors so as to generate a motion compensated block, and the motion compensated block is compared with said respective block;

means for selectively subjecting said respective block, according to the second determined result, to said inter-field motion interpolation process where first and second forward motion vectors are detected with reference to previous coded fields for the even and odd lines of said respective block, respectively, first and second backward motion vectors are detected with reference to future coded fields for the even and odd lines of said respective block, respectively, three motion compensations are performed by respectively using the detected first and second forward motion vectors, the first and second backward motion vectors, and the first and second forward and backward motion vectors, and including performing comparisons between results of the three motion compensation together with said respective block.

31. An apparatus according to claim 30, wherein said (c) means comprises means, for performing the block coding process, comprising:

means for discrete cosine transforming (DCT) each of said sub-blocks into DCT coefficients;

means for quantizing the DCT coefficients;

means for zig-zag scanning the quantized DCT coefficients;

means for variable length coding (VLC) the result of the zig-zag scanning to generate encoded information.

32. An apparatus according to claim 31, further comprising means for performing a block decoding process comprising:

means for demultiplexing/VLC decoding the encoded information to reproduce the zig-zag scanned sub-blocks and included side information describing the sub-blocks;

means for inverse zig-zag scanning said sub-blocks followed by inverse quantizing of the sub-blocks to reproduce the DCT coefficients;

means for inverse DCT processing said coefficients and generating a result;

means for subjecting the result of the inverse DCT processing to one of inverse inter-frame motion compensation processing and inverse inter-field motion compensation processing, according to (i) a coded picture type (I, P or B-picture) of the encoded information and (ii) a coded result of said (b) means to reproduce the sub-blocks; and means for inverting of the field restructuring process according to the coded result of said (b) means to reproduce the respective block.

33. An apparatus according to claim 29, wherein the field restructuring process further comprises:

means for subjecting said sub-blocks that contain chrominance information to an intra-field sub-sampling process to reduce resolution.

34. An apparatus according to claim 29, wherein said (c) means comprise means, for performing the block coding process, comprising:

means for discrete cosine transforming (DCT) each of said sub-blocks into DCT coefficients;

means for quantizing the DCT coefficients;

means for zig-zag scanning the quantized DCT coefficients;

means for variable length coding (VLC) the result of the zig-zag scanning to produce encoded information.

35. An method according to claim 34, further comprising means for performing a block decoding process comprising:

means for demultiplexing/VLC decoding the encoded information to reproduce the zig-zag scanned sub-blocks and included side information describing the sub-blocks;

means for inverse zig-zag scanning said sub-blocks followed by inverse quantizing of the sub-blocks to reproduce the DCT coefficients;

means for inverse DCT processing said coefficients and producing a result;

means for subjecting the result of the inverse DCT processing to one of inverse inter-frame motion compensation processing and inverse inter-field motion compensation processing, according to (i) a coded picture type (I, P or B-picture) and (ii) a coded result of said (b) means to reproduce the sub-blocks; and means for inverting of the field restructuring process according to the coded result of said (b) means to reproduce the respective block.

36. An apparatus according to claim 29, wherein said (b) means comprises:

(i) means for determining an inter-field difference and an intra-field difference of pixel values of two fields within each respective block of said blocks of pixel data before subjecting said blocks of pixel data to coding processing, and (ii) means for comparing said inter-field difference and said intra-field difference to obtain said difference of said (b) means.

* * * * *